Figure 1:
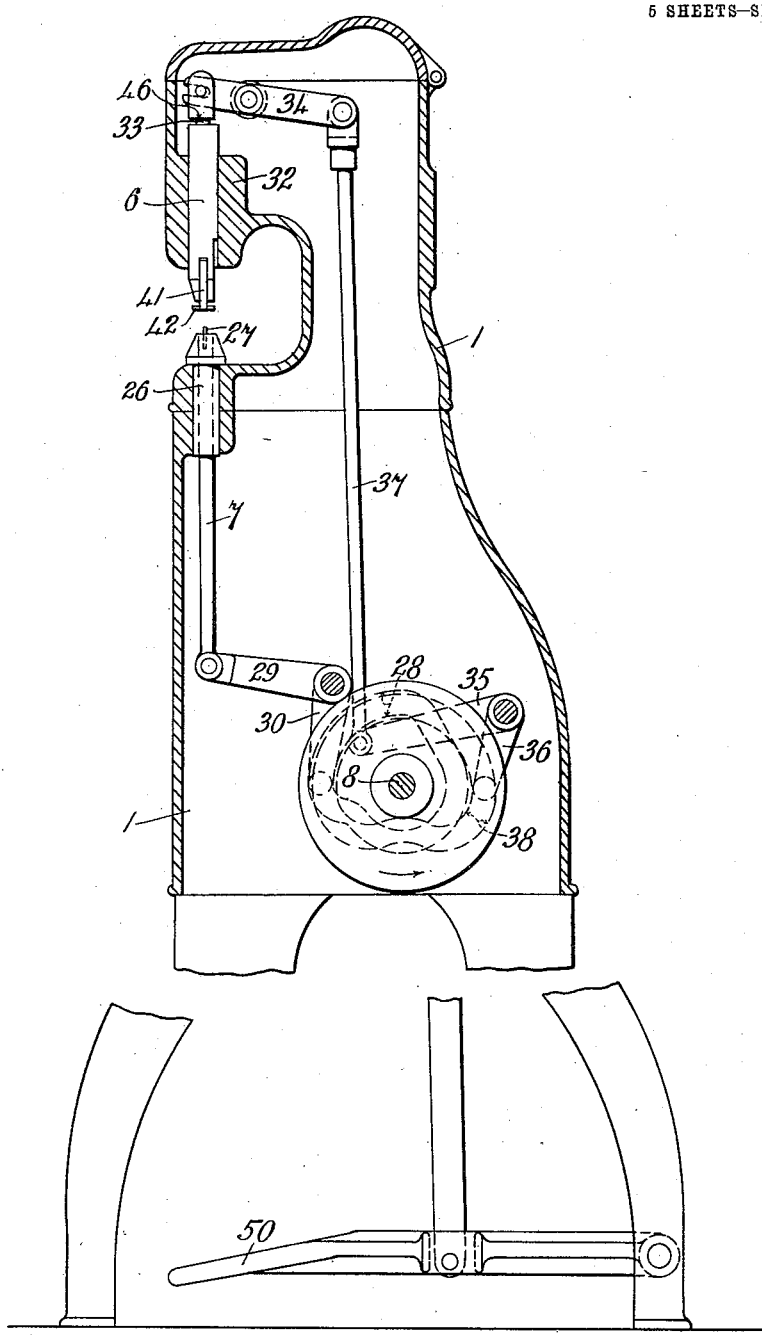
Figure 1A:
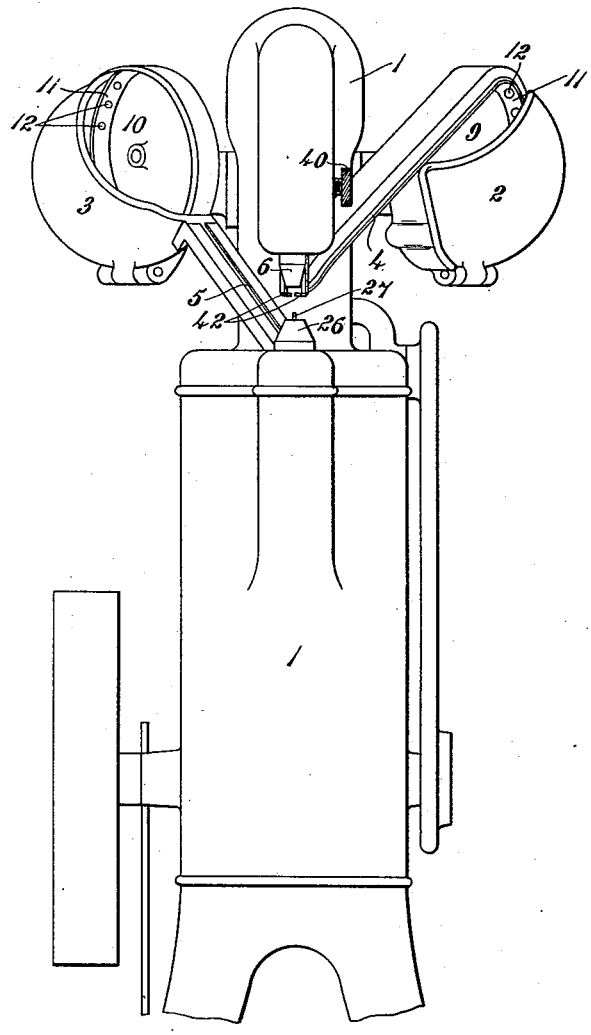
Figure 1A:
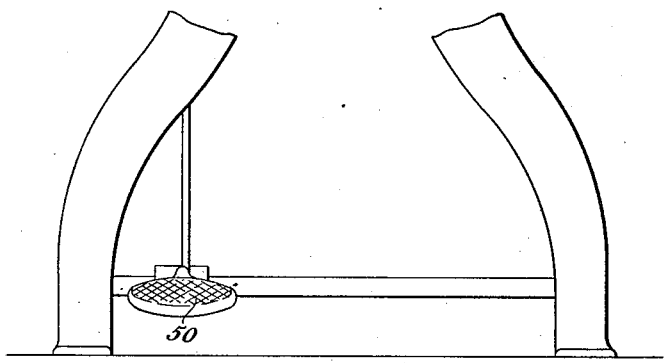

A. H. SHIPLEY.
MACHINE FOR INSERTING LACING STUDS.
APPLICATION FILED OCT. 20, 1911.

1,085,878.

Patented Feb. 3, 1914.
5 SHEETS—SHEET 1.

A. H. SHIPLEY.
MACHINE FOR INSERTING LACING STUDS.
APPLICATION FILED OCT. 20, 1911.

1,085,878.

Patented Feb. 3, 1914.
5 SHEETS—SHEET 2.

A. H. SHIPLEY.
MACHINE FOR INSERTING LACING STUDS.
APPLICATION FILED OCT. 20, 1911.

1,085,878.

Patented Feb. 3, 1914.
5 SHEETS—SHEET 3.

Witnesses:-
John C. Sanders
Leon Spring

Inventor.
Arthur Hammond Shipley
BY
Atty

A. H. SHIPLEY.
MACHINE FOR INSERTING LACING STUDS.
APPLICATION FILED OCT. 20, 1911.
1,085,878.
Patented Feb. 3, 1914.
5 SHEETS—SHEET 4.
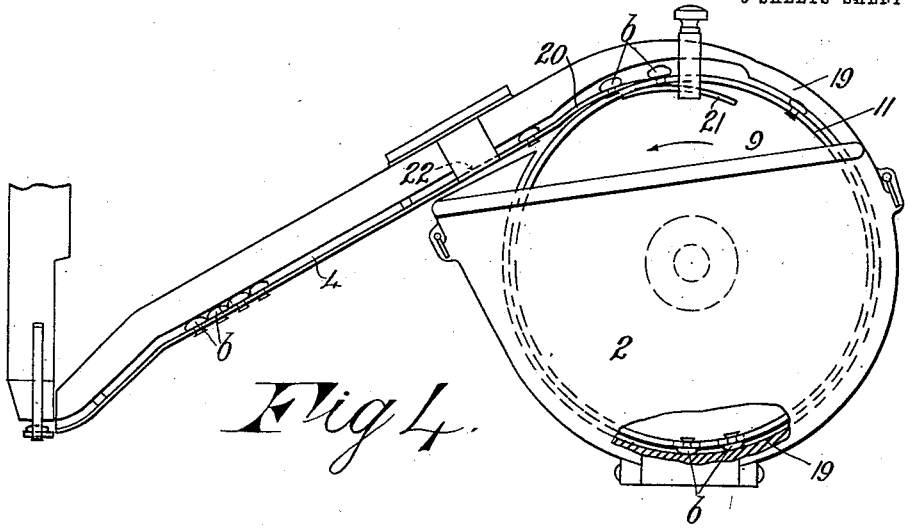
Fig. 4.
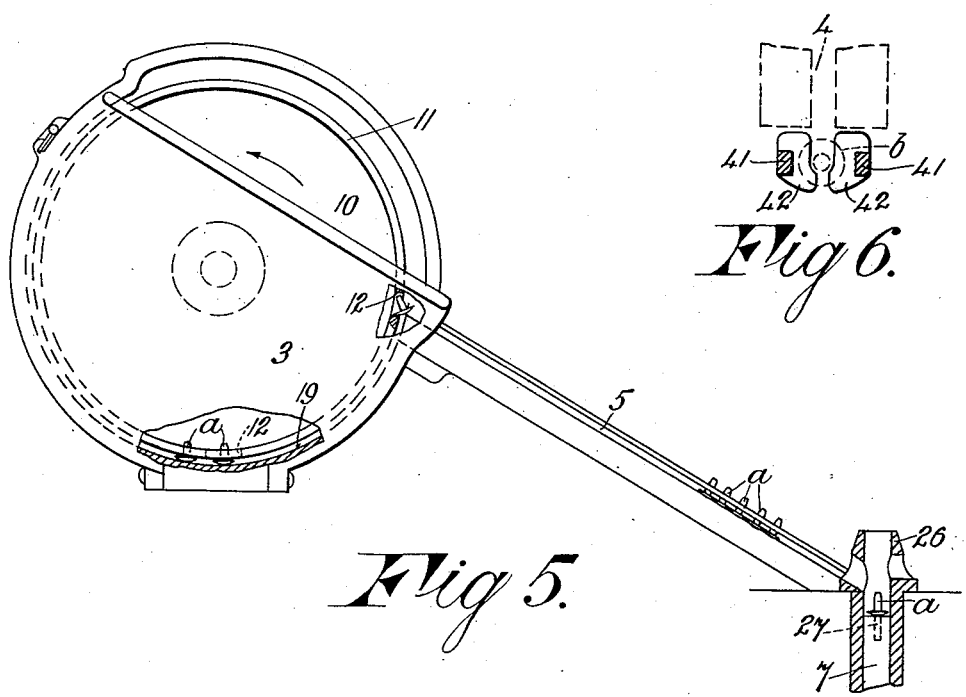
Fig. 5.
Fig. 6.
Witnesses:—
John C. Sanders
Leon Spring
Inventor.
Arthur Hammond Shipley
BY
ATT'Y

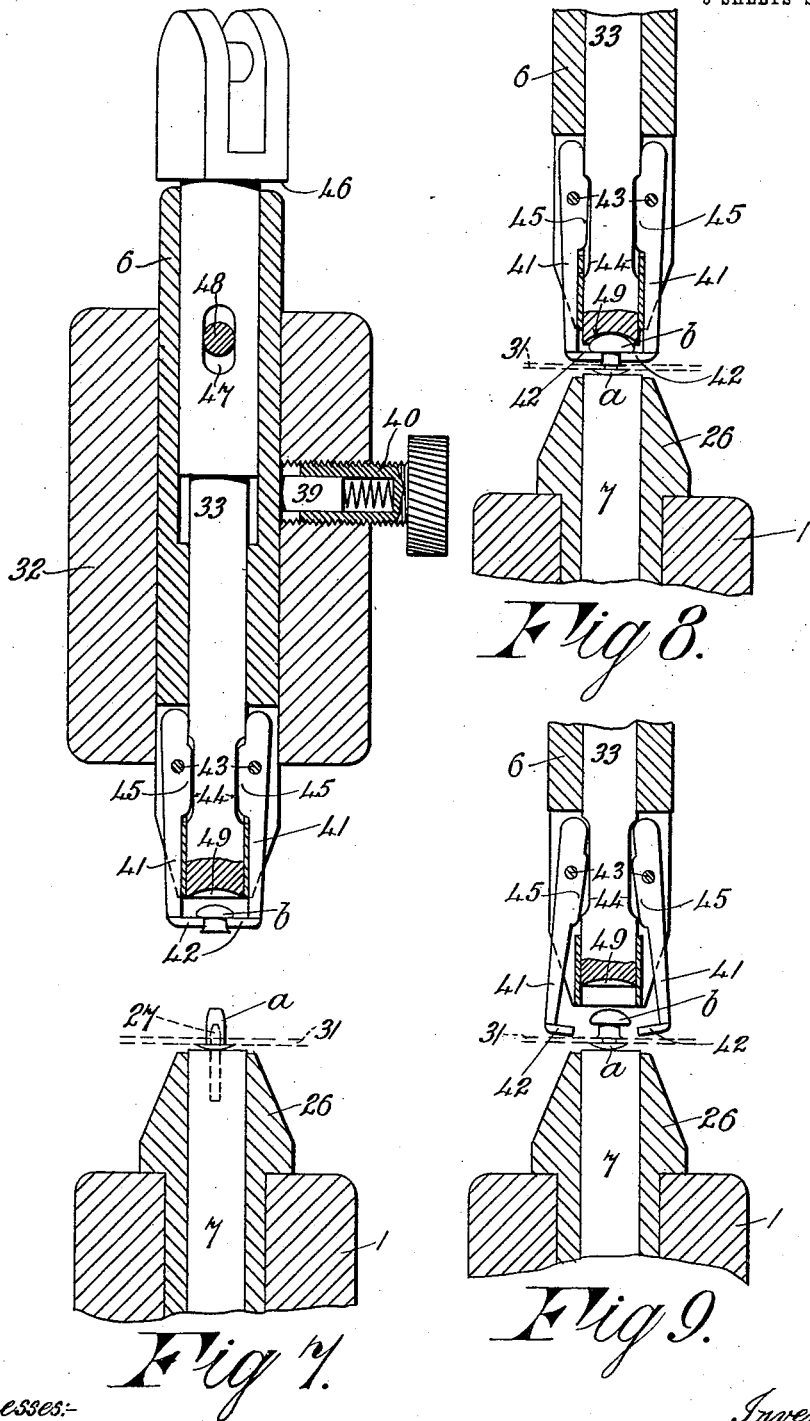
A. H. SHIPLEY.
MACHINE FOR INSERTING LACING STUDS.
APPLICATION FILED OCT. 20, 1911.
1,085,878.
Patented Feb. 3, 1914.
5 SHEETS—SHEET 5.

UNITED STATES PATENT OFFICE.

ARTHUR HAMMOND SHIPLEY, OF LEICESTER, ENGLAND, ASSIGNOR TO WESTON, SHIPLEY & WESTON, LIMITED, OF LEICESTER, ENGLAND.

MACHINE FOR INSERTING LACING-STUDS.

1,085,878.  Specification of Letters Patent.  Patented Feb. 3, 1914.

Application filed October 20, 1911. Serial No. 655,659.

*To all whom it may concern:*

Be it known that I, ARTHUR HAMMOND SHIPLEY, a subject of the King of Great Britain, residing at Leicester, in the county of Leicester, England, have invented new and useful Improvements in Machines for Inserting Lacing-Studs, of which the following is a specification.

This invention relates to a machine for inserting what are known as lacing studs into material such for example as the uppers of boots and shoes.

The object of the invention is to produce a machine which will automatically insert fasteners of the known type comprising a stud or shank portion and a button or head portion, the two parts being brought together on opposite sides of the material and then clenched or pressed together to permanently unite them.

The two portions of the fasteners will be hereinafter referred to as the stud and button portions respectively and these are separately contained in two hoppers or pouches on the machine.

An important feature of the invention is that the fasteners are inserted into the material with the button portion uppermost, the outside of the material being upwardly disposed and thereby presenting the right side to the view of the operator. The material is previously perforated for the reception of the studs and in the operation of the machine of the present invention the operator presents each hole in the material and depresses a pedal or moves a lever whereupon the machine makes one revolution and automatically inserts a fastener.

The stud parts are lifted from their respective hoppers by means of rotary elevators and are thereby delivered to chutes down which they travel to the inserting mechanism.

Each chute has a separating or escapement device to deliver the respective fastener parts one at a time to the inserting mechanism; the latter comprising a die rod to receive and hold the stud part, and a presser rod furnished with movable jaws to receive and hold the button part and adapted to place it in position upon the stud and afterward clench it thereon.

The stud parts are fed into position stem upward and the button parts are fed into position over the stud parts with their shanks downward so that the material may be presented to the machine face upward to receive the lacing studs.

The invention will be hereinafter further described with reference to the accompanying drawings, wherein:—

Figure 2:
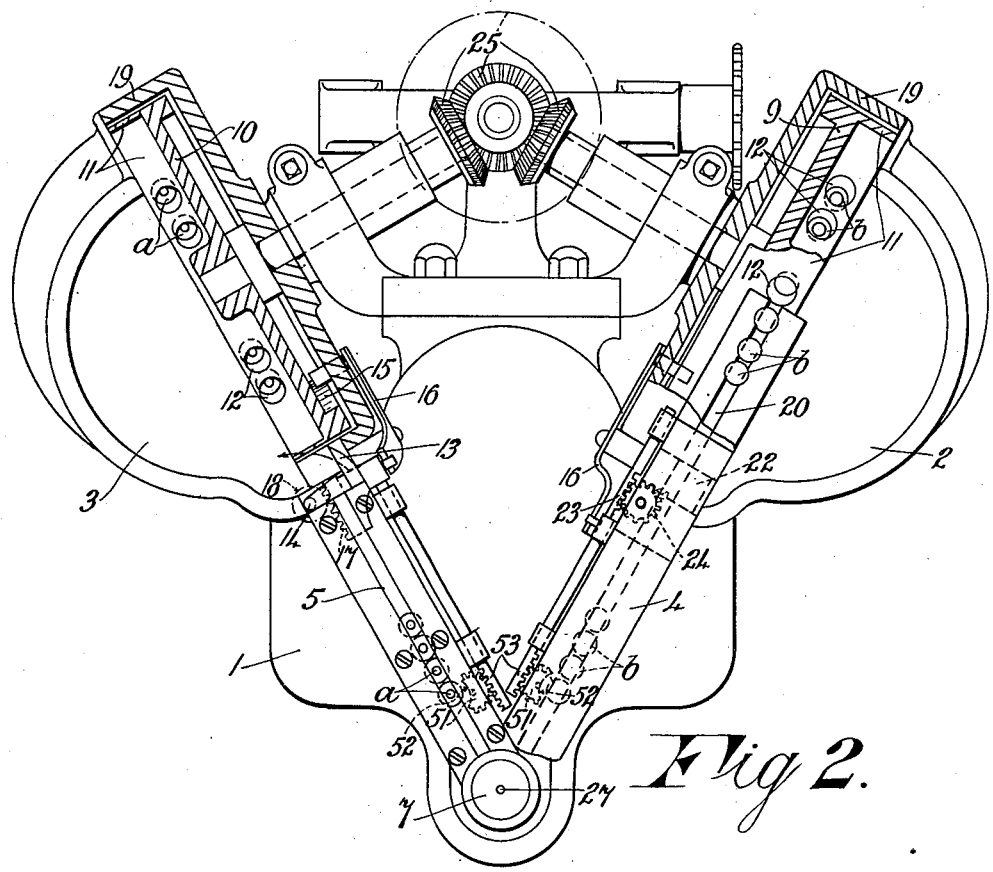
Figure 3:
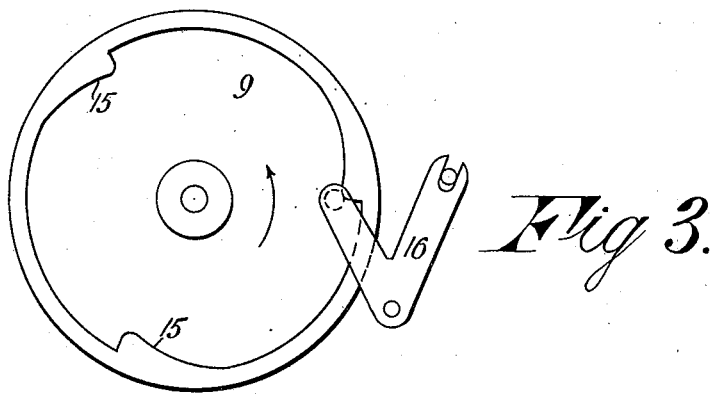

Figure 1 is a sectional side elevation of one form of the machine. Fig. 1ª is a front elevation of the machine. Fig. 2 is a plan view the top portion of the machine being removed. Fig. 3 shows an elevator removed from one of the hoppers. Fig. 4 is a side view of the button pouch or hopper and chute. Fig. 5 is a similar view showing the stud hopper and chute. Fig. 6 is a plan of the jaws on the presser rod for receiving and holding the button parts of the studs. Fig. 7 is a sectional view showing the mechanism immediately concerned in affixing the studs, said mechanism being in the normal position. Fig. 8 shows the same mechanism in the act of clenching the two stud parts. Fig. 9 is a further view of the same mechanism showing the release of the button part after having been affixed. Fig. 1 is drawn to a smaller scale and Figs. 6 to 9 to a larger scale than Figs. 2 to 5.

Like parts are designated by the same reference characters throughout the drawings.

In the machine of the drawings, 1 is the frame in and on which the various mechanisms are mounted, said mechanism comprising principally a button pouch or hopper 2, a stud pouch or hopper 3, a button chute 4, stud chute 5, a presser rod 6 for the button parts, and a die rod 7 for the stud parts.

All the mechanisms of the machine are actuated by suitable intermediate connections or means from a shaft 8 which latter is suitably driven preferably by power.

Combined with each pouch or hopper 2 and 3 is a rotary elevator 9 and 10 respectively which separates the parts contained within the hoppers and delivers said parts to the respective chutes 4 and 5 as will be hereinafter described. The said rotary elevators 9 and 10 are in the form of circular caps or flanged plates (Fig. 2) and are arranged against the open sides of the pouches or hoppers so that the fastener parts collect on the inside of the caps.

The caps or elevators are arranged vertically and the fastener parts accumulate on the interior of the flanged portions 11 of the elevators which flanges are furnished with holes 12 therein (Fig. 2) into which the fastener parts fall so as to be carried around by the flange 11 and delivered to the chutes as shown in Figs. 4 and 5.

In the case of the stud portions $a$ of the fasteners, the natural position for these to fall in is with their stem upward and when they so fall into the holes 12 (Fig. 5) they are carried around by the elevator 10 and are delivered in the same position to the shoot 5 down which they pass by gravity. The stud portions $a$ which do not correctly enter the holes 12 in the elevator 10 are either discharged back into the hopper 3 or, if they are carried to the chute, they do not enter the mouth of the chute but accumulate there until they are forcibly removed by means of a transversely movable clearer 13 pivoted at 14 and which is periodically moved across the mouth of the chute by cams 15 (Fig. 2) on the rotary elevator which cams operate a lever 16 adapted to transmit movement to the clearer 13 through the medium of a rack 17 and pinion 18. The clearer 13 swings around, as indicated by the arrow, for the purpose of removing wrongly positioned or accumulated stud portions which latter are thereby swept back into the hopper 3.

The flange 11 of the elevator 10 rotates within an outer stationary wall 19 between which and the exterior of the said flange the heads of stud portions $a$ become located (as shown in Fig. 5) while the latter are being carried around by the elevator to the mouth of the chute 5.

The elevator 9 of the button portion hopper operates in a manner similar to that of the stud portion elevator 10 just described. That is to say, the natural position for the button portions $b$ to fall in is head downward as shown in Fig. 4, and therefore the bulk of the button portions $b$ resting on the exterior of the flange 11 of the rotary elevator fall into the holes 12 in this position and are consequently carried around by the elevator to the chute 4 the heads of the button parts being located between the flange 11 and a fixed outer wall 19 (Fig. 4). The button portions which do not correctly enter the holes 12 fall out again during the rotation of the elevator 9 and thus return to the pouch or hopper 2. Those parts $b$ which do enter the holes properly however, are carried around by the elevator, as shown in Fig. 4, and are delivered, head uppermost, to a guideway 20 (Figs. 2 and 4) which leads to the button chute 4, the said parts being lifted onto the guideway by a curved plate 21 (Fig. 4) over which they ride as they are carried around by the flange 11 of the elevator. In this guideway 20 is a bridge 22 which is periodically reciprocated or moved transversely to and fro by means of cams 15 on the elevator 9 (Fig. 3). The bridge 22 is actuated from the cams 15 through the medium of a lever 16, a rack 23 and pinion 24 (Fig. 2) and said bridge forms one side of the guideway along which the buttons must pass to the chute 4. When the button chute 4 is fully loaded with button portions $b$, any accumulation of the said parts $b$ at the mouth of the chute is prevented by the moving bridge 22 which, upon being moved transversely allows the surplus button parts to fall back into the hopper 2.

The elevators 9 and 10 are preferably driven in unison but in opposite directions from the same gearing 25 which latter may be driven by chain and chain wheels or in any other manner from the main shaft 8 of the machine. The holes 12 in the flanges 11 of the elevators may, if desired, be recessed on the rear side to receive the stems of the stud and button portions so that the heads of said portions may rest against the outside of the flanges and prevent the parts falling out of the holes back into the interior of the elevators.

The chute 5 for the stud portions $a$ of the fasteners leads down to the locality of the die rod 7 which has a vertical movement in a bearing 26 located in the front of the machine frame 1 and is furnished at its upper end with a point or pin 27 on which the stud portion $a$ of the fastener is received and held.

The up and down movements are imparted to the die rod 7 by a cam 28 on the shaft 8 which cam operates through levers 29 and 30 (Fig. 1) or other suitable mechanism to move said rod. To receive a stud $a$, the die rod 7 is drawn down below the end of the stud chute 5 as shown in Fig. 5, and when a stud falls from said chute it falls down the bearing 26 and onto the spike or pin 27 on the lowered rod 7 which latter is thereupon raised and carries the stud $a$ to a position above the chute as shown in Fig. 7, and is held there ready for the perforated material 31 to be placed upon the upstanding stem of the stud.

The chute 4 for the button portions $b$ of the fasteners leads down into close proximity to the end of the presser rod 6 which latter is movable up and down in a bearing 32 in the framing 1 and is immediately in line with the before mentioned die rod 7. This presser rod consists of two parts, an inner rod 33 or presser proper, and an outer sleeve 6. The inner rod 33 is connected by a suitable arrangement of levers 34, 35 and 36 and a link 37 with a cam 38 on the shaft 8 which cam imparts a reciprocating movement to the rod 33 within the sleeve 6 and also, indirectly, an up and down movement to the latter in the bearing 32.

The movement of the outer sleeve 6 within its bearing 32 is frictionally restricted by means of an adjustable spring pressed pin 39 (Fig. 7) located in a screw 40 and said sleeve carries at its lower end two pivoted jaws or claws 41, 41 which have inwardly bent ends 42 (Figs. 6 and 7.) The jaws 41 are arranged on pivot pins 43 so as to be capable of being rocked in the sleeve and when so actuated the bent ends 42 move toward and from each other underneath the end of the presser rod, as will be seen by reference to Figs. 7 and 9.

The opening and closing movement is imparted to the jaws 41, and also the up and down movement is directly imparted to the sleeve 6, by the inner presser rod 33 which latter has a recessed or cam surface 44 engaged by feet 45 on the upper inner ends of the jaws 41 (Fig. 7) while a shoulder 46 on the presser rod 33 may engage the sleeve 6 to actuate the latter in a downward direction within its bearing and the end of a slot 47 in the rod 33 may engage a pin 48 in the sleeve 6 to move the latter upward.

From the foregoing description and upon reference to Fig. 7 it will be seen that the inner presser rod 33 has a limited free movement within the sleeve 6 and the formation and arrangement of the cam surface 44 and feet 45 are such that an upward movement of the inner rod within the sleeve will open the jaws 41, while a downward movement of said inner rod will close said jaws.

During the upward and downward movements of the inner rod 33 within the sleeve 6 the latter is held stationary by the pressure of the friction pin 39, but upon the inner rod reaching the limit of its free movement in either direction (the limit being caused by the shoulder 46 or slot end 47) its continued movement causes a bodily movement of the sleeve 6 so that at each reciprocation of the inner rod 33, the outer sleeve 6 travels in company with the said inner rod for a certain distance.

The length of the cam surface 44 on the rod 33 is such that after the said rod has closed the jaws 41 it may move farther downward in the sleeve 6. This provides that the inner presser rod may, after a button part b has been received on the jaws 41, descend to hold the head of the button between its concaved end 49 and said jaws as shown in Fig. 8.

The bent ends 42 of the jaws 41 when in the closed position (see Figs. 4 and 6) receive a button b from the chute 4 and are adapted to support said button under the head thereof as shown in Fig. 7. The button b may merely rest upon the bent ends 42 of the jaws 41 or its shank may be gripped between said jaws if desired.

After receiving a button, the presser rod 33, sleeve 6 and jaws 41 move downward carrying the button therewith and position the latter on the stud a as shown in Fig. 8, and the presser rod 33 clenches the two parts a and b together. It will be understood that before the two parts of the fastener are brought together in the manner just described, the material 31 (previously perforated) is placed in position, face upward, on the upstanding stem of the stud part a, and that during the downward clenching pressure of the presser rod to affix the fastening, the die rod 7 is held stationary in the upward position by its cam 28 the two parts of the fastening being pressed between the end of the die rod 7 and the concaved end 49 of the inner presser rod 33. It might however be so arranged that the die rod 7 should have a slight rising movement to meet the opposing downward movement of the presser rod during the clenching operation to facilitate the latter. Or further, the presser rod might descend to bring the button part into relative position on the stud and then remain stationary while the die rod rose to clench the two parts together.

After clenching the parts a and b the inner presser rod 33 rises and before imparting any rising movement to the sleeve 6 and jaws 41, it opens the latter so that they move away from the button b as shown in Fig. 9 and can rise clear of it. After rising and returning the sleeve 6 to its normal raised position, the inner rod 33 moves downward again for a short distance to close the jaws 41 or move them toward each other preparatory to their receiving another button from the chute 4.

The main shaft 8 of the machine is driven, preferably from a continuously running pulley (not shown) by means of any suitable form of single cycle clutch mechanism brought into operation by the depression of a treadle 50 (Fig. 1) or the actuation of an equivalent member.

The chutes 4 and 5 and hoppers 2 and 3 are, as shown in Fig. 2, arranged on opposite sides of the machine and each chute is furnished with an escapement or separating device which allows only one stud a and button part b at a time to pass to the die rod 7 and jaws 41. This device may conveniently consist of a rotary disk 51 which intercepts the passage of the parts down the chute. The said disk 51 has a recess or curved opening 52 in one side and this recess, each time the disk rotates or oscillates, passes one of the parts, i. e. it receives a part therein and transmits it on along the chute to be delivered.

The disks 51 may be toothed and be actuated by racks 53 from the cams 15 on the rotary elevators 9 and 10 or they may be actuated by any other suitable mechanism.

The machine of this invention, instead of being employed for automatically inserting and fixing two part lacing studs as hereinbefore described, may be used for automatically inserting and fixing lacing studs or similar articles which consist of but a single member, such for example as a button member adapted to be attached by clenching or bending out its shank after the manner of an eyelet. When so used, the present machine may comprise but a single hopper and chute such for example as the hopper 2 and chute 4, and the die rod 7 instead of being movable would be stationary, unless it is desired to use the up and down movement of the presser rod merely for the purpose of positioning the fastening in which case an upward movement of the die rod would be required to clench or expand the fastening in the material.

What I claim then is:—

In a machine for inserting the button part of lacing studs, means for receiving and setting the button part, consisting of an outer sleeve having a frictionally restricted sliding movement, an inner presser rod having a limited longitudinal movement within the sleeve, pivoted jaws in the end of the sleeve, inwardly bent ends on said jaws to receive the button part and support it under the end of the presser rod, feet on said jaws, a cam surface on the inner presser rod engaging the feet on the jaws and respectively opening and closing said jaws upon an upward and downward movement of the said rod taking place within the sleeve, and means to actuate the said rod, the latter imparting a bodily movement to the sleeve upon reaching the limit of its free movement within the sleeve in either direction, substantially as described.

In testimony whereof I have signed my name to this specification in the presence of two subscribing witnesses.

ARTHUR HAMMOND SHIPLEY.

Witnesses:
 E. N. LEWIS,
 GEORGE LESTER.

Copies of this patent may be obtained for five cents each, by addressing the "Commissioner of Patents, Washington, D. C."